US007622692B2

(12) United States Patent
McDonald et al.

(10) Patent No.: US 7,622,692 B2
(45) Date of Patent: Nov. 24, 2009

(54) METHODS AND SYSTEMS FOR SORTING UNADDRESSED ITEMS

(75) Inventors: Glenn Edward McDonald, Alexandria, VA (US); Wilson Wong, Bowie, MD (US)

(73) Assignee: United States Postal Service, Washington, DC (US)

( * ) Notice: Subject to any disclaimer, the term of this patent is extended or adjusted under 35 U.S.C. 154(b) by 118 days.

(21) Appl. No.: 11/657,018

(22) Filed: Jan. 24, 2007

(65) Prior Publication Data

US 2007/0142963 A1 Jun. 21, 2007

Related U.S. Application Data

(62) Division of application No. 10/952,818, filed on Sep. 30, 2004.

(60) Provisional application No. 60/562,437, filed on Apr. 15, 2004.

(51) Int. Cl.
*G06K 9/00* (2006.01)

(52) U.S. Cl. ........................ 209/584; 209/583; 209/900

(58) Field of Classification Search ................. 209/583, 209/584, 900
See application file for complete search history.

(56) References Cited

U.S. PATENT DOCUMENTS 5,925,864 A 7/1999 Sansone et al.
5,998,752 A * 12/1999 Barton et al. ............... 209/583
6,208,910 B1 * 3/2001 Michael et al. ............. 700/225
6,292,709 B1 9/2001 Uhl et al.
6,385,504 B1 5/2002 Pintsov et al.
6,576,857 B1 * 6/2003 De Leo et al. ............. 209/584
6,714,835 B1 3/2004 Hart, Jr. et al.
6,762,384 B1 7/2004 Kechel
6,789,729 B1 * 9/2004 Solan et al. ................. 235/375
6,801,833 B2 * 10/2004 Pinstov et al. ............... 700/223
6,807,459 B2 10/2004 Rosenbaum et al.
6,880,753 B2 * 4/2005 Ogihara et al. .............. 235/385
6,978,192 B2 12/2005 Wisniewski (Continued)

FOREIGN PATENT DOCUMENTS

EP 1066886 A2 1/2001

(Continued)

OTHER PUBLICATIONS

Notification of Transmittal, International Search Report, and the Written Opinion of the International Searching Authority dated Mar. 23, 2007, in International Application No. PCT/US04/32203 (7 pages).

(Continued)

*Primary Examiner*—Patrick H Mackey
*Assistant Examiner*—Terrell H Matthews
(74) *Attorney, Agent, or Firm*—Finnegan, Henderson, Farabow, Garrett & Dunner LLP

(57) ABSTRACT

Systems and methods for sorting a plurality of unaddressed items may comprise receiving delivery point address data. Furthermore, systems and methods for sorting a plurality of unaddressed items may comprise sorting the plurality of unaddressed items based on the delivery point address data. The plurality of unaddressed items may be sorted in an order in which they are to be delivered within a delivery zone specified by the delivery point address data.

17 Claims, 4 Drawing Sheets

U.S. PATENT DOCUMENTS

| | | | |
|---|---|---|---|
| 7,112,756 B2 | 9/2006 | Hanson | |
| 2002/0032623 A1 * | 3/2002 | Wheeler et al. | 705/28 |
| 2003/0182018 A1 | 9/2003 | Snapp | |
| 2004/0133528 A1 * | 7/2004 | Furka | 705/401 |
| 2004/0153208 A1 * | 8/2004 | Wilke | 700/224 |

FOREIGN PATENT DOCUMENTS

| | | |
|---|---|---|
| WO | WO 03/088073 A2 | 10/2003 |

OTHER PUBLICATIONS

Communication and Search Report from the European Patent Office for Application No. 04789364.9, dated Sep. 16, 2008 (6 pages).

International Preliminary Report on Patentability for International Application No. PCT/US2004/032203, dated Apr. 17, 2007 (4 pages).

* cited by examiner

METHODS AND SYSTEMS FOR SORTING UNADDRESSED ITEMS

RELATED APPLICATION

This is a division of Application No. 10/952,818, filed Sep. 30, 2004, and claims the benefit of U.S. Provisional Application No. 60/562,437 filed Apr. 15, 2004, which is incorporated herein by reference.

BACKGROUND

I. Technical Field

The present invention generally relates to sorting unaddressed items. More particularly, the present invention relates to sorting unaddressed items based on delivery point address data.

II. Background Information

The United States Postal Service (USPS) is an independent government agency that provides mail delivery and other services to the public. The USPS is widely recognized as a safe and reliable means for sending and receiving mail and other items. With the advent and steady growth of electronic mail and electronic commerce, item delivery systems will increasingly be utilized for sending and receiving packages and other items. In the context of item delivery, a delivery system operator may desire, for example, to sort unaddressed items.

When items corresponding to a particular delivery route are to be delivered, a manual casing process may be used by a delivery system operator. In the casing process, addressed items to be delivered may be placed in a case in a sequence corresponding to delivery points along the route. For example, the items corresponding to a first delivery point in the route may be placed in the front of the case. Then, items corresponding to a second delivery point may be placed in the case next. This process may continue until all the items are place in the case according to the route's delivery point sequence. Any particular item's delivery point may be indicated by a delivery address on the item.

When delivering unaddressed items using the above casing process, one solution is to associate two physical pieces, a detached address label (DAL) that contains specific delivery point information (such as an address), and a separate unaddressed piece that comprises the unaddressed item itself. To effect delivery of the unaddressed item, the DAL may be inserted into the case in order to establish the delivery sequence for the corresponding unaddressed item. When the case is taken out along the delivery route for delivery, the DAL serves as a visual cue to an operator delivering the items in the case that an unaddressed item is to be delivered at this point on the route. When the DAL is encountered by the operator delivering the items in the case, the operator may, for example, take an unaddressed item from a separate bundle and deliver it to the delivery point.

Great inefficiencies are created in this procedure because, for example, the aforementioned processes can be very costly and time consuming. Accordingly, efficiently sorting unaddressed items remains an elusive goal. Thus, there remains a need to efficiently sort unaddressed items. In addition, there remains a need to efficiently sort unaddressed items based on the delivery point address data.

SUMMARY

Consistent with embodiments of the present invention, systems and methods are disclosed for sorting unaddressed items.

In accordance with one embodiment, a method for sorting a plurality of unaddressed items comprises receiving delivery point address data, sorting the plurality of unaddressed items based on the delivery point address data, the plurality of unaddressed items being sorted in an order in which they are to be delivered within a delivery zone specified by the delivery point address data.

In accordance with another embodiment, a method for sorting a plurality of unaddressed items comprises reading detached address label data from a plurality of detached address labels, creating delivery point address data from the detached address label data, and sorting the plurality of unaddressed items based on the delivery point address data, the plurality of unaddressed items being sorted in an order in which they are to be delivered within a delivery zone specified by the delivery point address data.

In accordance with yet another embodiment, a system for sorting a plurality of unaddressed items comprises a memory storage for maintaining a database and a processing unit coupled to the memory storage, wherein the processing unit is operative to receive delivery point address data, sort the plurality of unaddressed items based on the delivery point address data, the plurality of unaddressed items being sorted in an order in which they are to be delivered within a delivery zone specified by the delivery point address data.

In accordance with yet another embodiment, a system for sorting a plurality of unaddressed items comprises a memory storage for maintaining a database and a processing unit coupled to the memory storage, wherein the processing unit is operative to read detached address label data from a plurality of detached address labels, create delivery point address data from the detached address label data, and sort the plurality of unaddressed items based on the delivery point address data, the plurality of unaddressed items being sorted in an order in which they are to be delivered within a delivery zone specified by the delivery point address data.

In accordance with yet another embodiment, a computer-readable medium comprises a set of instructions which, when executed, perform a method for sorting a plurality of unaddressed items comprises receiving delivery point address data, and sorting the plurality of unaddressed items based on the delivery point address data, the plurality of unaddressed items being sorted in an order in which they are to be delivered within a delivery zone specified by the delivery point address data.

In accordance with yet another embodiment, a computer-readable medium comprises a set of instructions which, when executed, performs a method for sorting a plurality of unaddressed items. The method comprises receiving delivery point address data, and sorting the plurality of unaddressed items based on the delivery point address data, the plurality of unaddressed items being sorted in an order in which they are to be delivered within a delivery zone specified by the delivery point address data.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Figure 1:
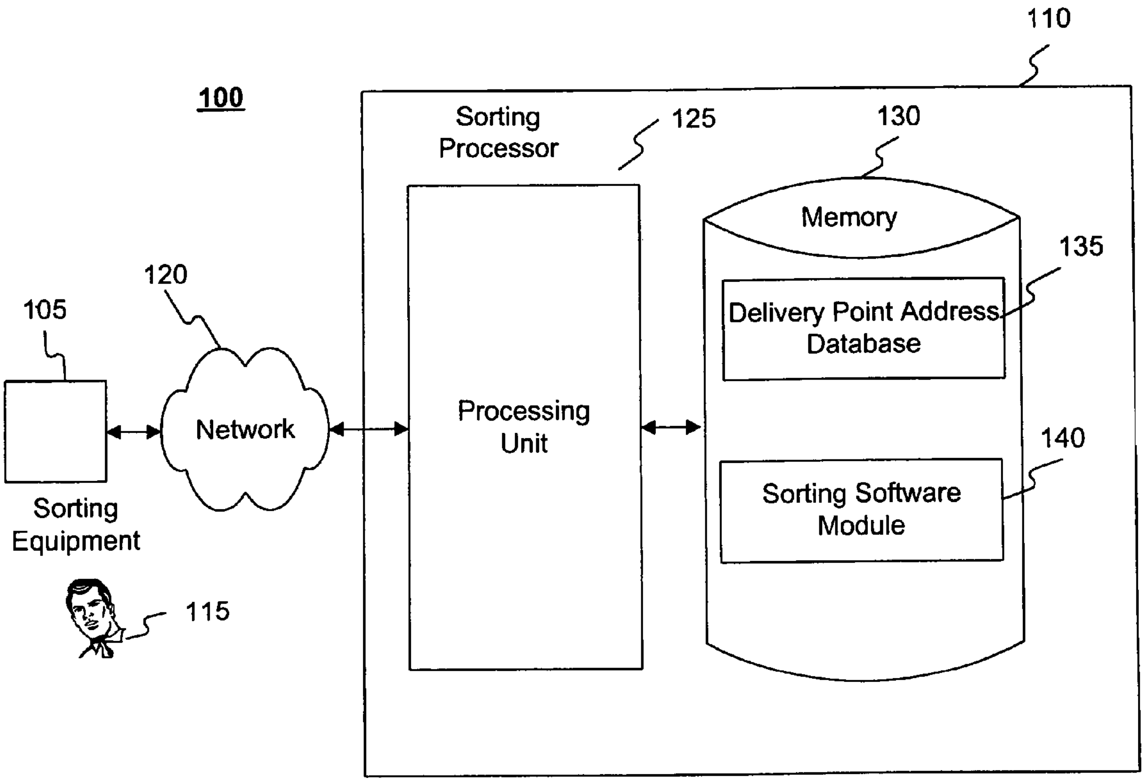
FIG. 1 is a block diagram of an exemplary sorting system consistent with an embodiment of the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

Systems and methods consistent with the invention may sort a plurality of unaddressed items that are to be delivered to one or more delivery points. A delivery point may be a physical place to which a delivery system operator may deliver an item. A delivery point may be, for example, a street letterbox, a door slot, an apartment building box cluster, or a separate post office box. The aforementioned are exemplary, and delivery points may comprise any location where an item may be delivered. Furthermore, an unaddressed item may comprise a mailpiece, a United States Postal Service Priority Mail package, a United States Postal Service Express Mail Package, or any other item to be delivered. Moreover, unaddressed items may comprise, but are not limited to, advertisements or any other item type that is directed to a particular delivery point without regards, for example, to the identity of a person or enterprise associated with the, particular, delivery point. The aforementioned are exemplary and the item may comprise any deliverable element.

Systems and methods consistent with the invention may eliminate, for example, the manual casing process for individually addressed items. These systems and methods may use addresses and barcodes appearing on an item, including items that may not be bar-coded or individually addressed. USPS ZIP Codes that may be sorted in delivery sequence may hereafter be called “automated delivery zones”. However, USPS ZIP Codes are exemplary, and automated delivery zones may comprise any indices, geographically related or not.

An embodiment consistent with the invention may comprise a system for sorting a plurality of unaddressed items. The system may comprise a memory storage for maintaining a database and a processing unit coupled to the memory storage. The processing unit may be operative to receive delivery point address data. Furthermore, the processing unit may be operative to sort the plurality of unaddressed items based on the delivery point address data, the plurality of unaddressed items being sorted in an order in which they are to be delivered within a delivery zone specified by the delivery point address data.

Another embodiment consistent with the invention may comprise a system for sorting a plurality of unaddressed items. The system may comprise a memory storage for maintaining a database and a processing unit coupled to the memory storage. The processing unit may be operative to read detached address label data from a plurality of detached address labels. Furthermore, the processing unit may be operative to create delivery point address data from the detached address label data. In addition, the processing-unit may be operative to sort the plurality of unaddressed items based on the delivery point address data, the plurality of unaddressed items being sorting in an order in which they are to be delivered within a delivery zone specified by the delivery point address data.

Consistent with an embodiment of the present invention, the aforementioned memories, processing units, and other components may be implemented in a sorting system, such as-an exemplary sorting system 100 of FIG. 1. Any suitable combination of hardware, software, and/or firmware may be used to implement the memory, processing unit, or other components. By way of example, the memory, processing unit, or other components may be implemented with a sorting processor 110 in combination with system 100. The aforementioned system and processor are exemplary and other systems and processors may comprise the aforementioned memory, processing unit, or other components, consistent with embodiments of the present invention.

By way of a non-limiting example, FIG. 1 illustrates system 100 in which the features and principles of the present invention may be implemented. As illustrated in the block diagram of FIG. 1, system 100 may include sorting equipment 105, sorting processor 110, a user 115, and a network 120. User 115 may be an individual, for example, a delivery system operator using sorting equipment 105 to sort unaddressed items. User 115 may also be an organization, enterprise, or any other entity having such desires.

Sorting processor 110 may include a processing unit 125 and a memory 130. Memory 130 may include a delivery point address database 135, and a sorting software module 140. Delivery point address database 135 may include delivery point address data, for example, as described below with respect to FIGS. 2 through 4. Sorting software module 140 may be executed on processing unit 125 and may access database 135. Sorting software module 140 may include, but is not limited to, any program capable of implementing, for example, all or some portions of the processes described below with respect to FIG. 2 and FIG. 4.

Sorting processor 110 (“the processor”), included in system 100, may be implemented using a personal computer, network computer, mainframe, or other similar microcomputer-based workstation. The processor may, though, comprise any type of computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, or a facsimile machine. The aforementioned systems and devices are exemplary and the processor may comprise other systems or devices.

Network 120 may comprise, for example, a local area network (LAN) or a wide area network (WAN). Such networking environments are commonplace in offices, enterprise-wide computer networks, intranets, and the Internet, and are known by those skilled in the art. When a LAN is used as network 120, a network interface located at any of the processors may be used to interconnect any of the processors. When network 120 is implemented in a WAN networking environment, such as the Internet, the processor may typically include an internal or external modem (not shown) or other means for establishing communications over the WAN. Further, in utilizing network 120, data sent over network 120 may be encrypted to insure data security by using known encryption/decryption techniques.

In addition to utilizing a wire line communications system as network 120, a wireless communications system, or a combination of wire line and wireless may be utilized as network 120 in order to, for example, exchange web pages via the Internet, exchange e-mails via the Internet, or for utilizing other communications channels. Wireless can be defined as radio transmission via the airwaves. However, it may be appreciated that various other communication techniques can be used to provide wireless transmission, including infrared line of sight, cellular, microwave, satellite, packet radio, and spread spectrum radio. The processor in the wireless environment can be any mobile terminal, such as the mobile terminals described above. Wireless data may include, but is not limited to, paging, text messaging, e-mail, Internet access and other specialized data applications specifically excluding or including voice transmission.

System 100 may also transmit data by methods and processes other than, or in combination with, network 120. These methods and processes-may include, but are not limited to, transferring data via diskette, CD ROM, memory sticks, facsimile, conventional mail, an interactive voice response system (IVR), or via voice over a publicly switched telephone network.

Figure 2:
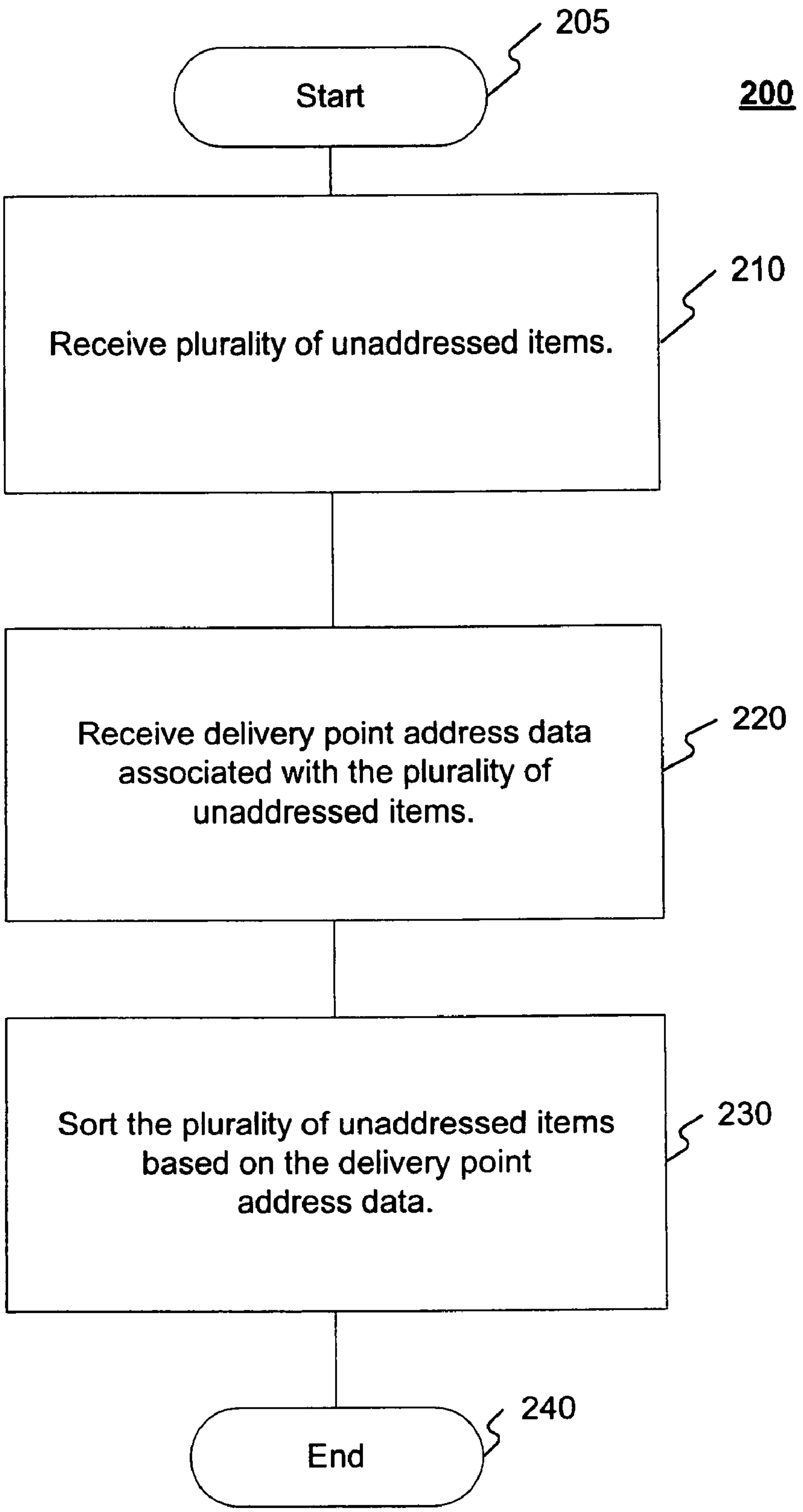
FIG. 2 is a flow chart of an exemplary method for sorting a plurality of unaddressed items consistent with an embodiment of the present invention.

FIG. 2 is a flow chart setting forth the general stages involved in an exemplary method for sorting a plurality of unaddressed items. Exemplary ways to implement the stages of method 200 will be described in greater detail below. Exemplary method 200 may begin at starting block 205 and proceed to stage 210 where a-delivery system operator may receive a plurality of unaddressed items. For example, the plurality of unaddressed items may comprise, but are not limited to, advertisements or any other item type that may be directed to particular delivery points without regard, for example, to the identity of persons or enterprises associated with the particular delivery points.

From stage 210, where delivery system operator receives the plurality of unaddressed items, exemplary method 200 may advance to stage 220 where sorting processor 110 may receive delivery point address data associated with the plurality of unaddressed items. For example, sorting processor 110 may periodically receive, over network 120, a delivery point address file for each automated delivery zone for which sorting processor 110 may sort items. A sender of the plurality of items may provide the delivery system operator both the plurality of items and the delivery point address file.

Figure 3:
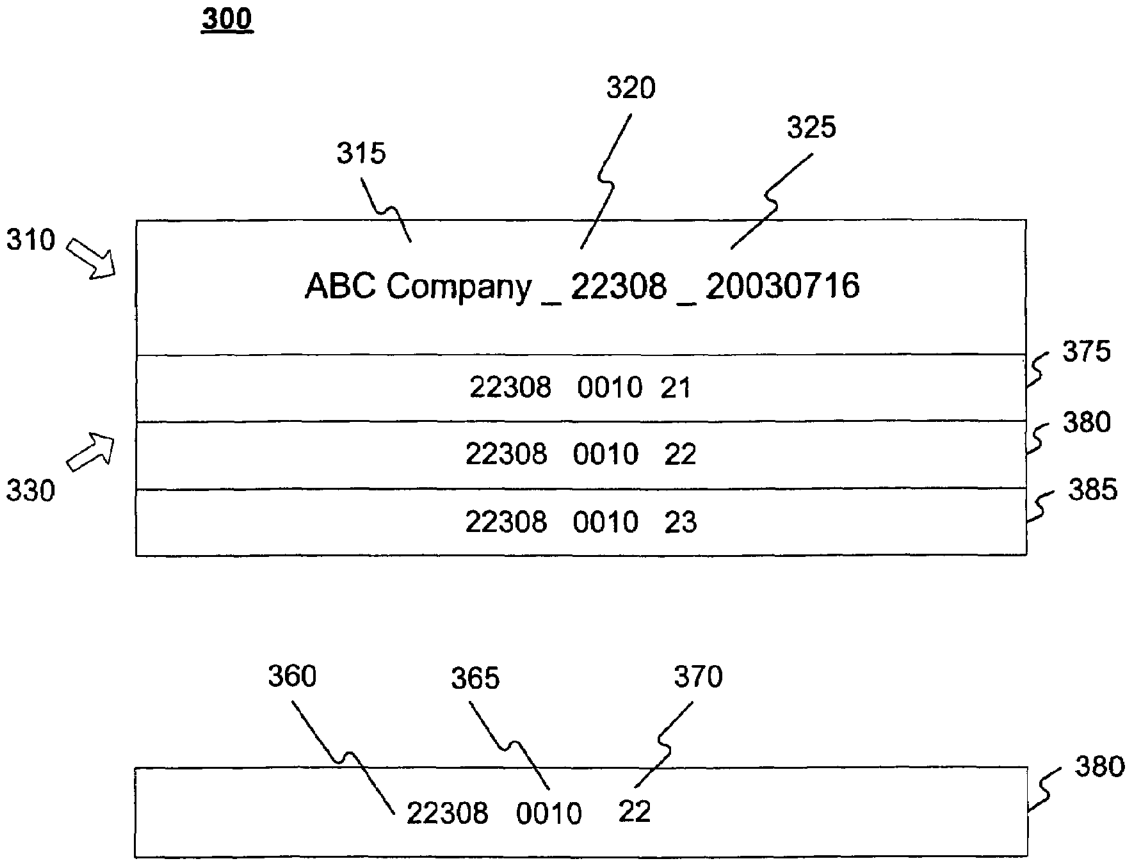
FIG. 3 illustrates an exemplary delivery point address file consistent with an embodiment of the present invention.

FIG. 3 shows an exemplary delivery point address file 300 consistent with an embodiment of the present invention. Delivery point address file 300 may contain, for example, a header record 310 that may identify a sender 315, a specific automated delivery zone code 320 whose delivery points may be therein contained, and a date 325 that delivery point address file 300 may have been certified. The certification, for example, may be produced by the USPS's Coding Accuracy Support System (CASS). A body 330 of the delivery point address file may contain, for example, records 375, 380, and 385 comprising a sequential listing of the delivery point addresses to which the sender of the plurality of items intends the plurality of items to be delivered. As shown in FIG. 3, delivery point address file header 310 may include "ABC-Company 22308"20030716. Header 300 may indicate that all delivery points contained in the delivery point address file are from ABC Company, are for designating ZIP Code 22308, in Alexandria Va., and that the verification date was Jul. 16, 2003. The records in body 330 may be physically sequential or delimited. For example record 380 may include sub-elements 360, 365, and 370. Sub-element 360 may comprise, for example, a physical 5-digit ZIP Code in which an unaddressed item may be delivered. Sub-element 365 may comprise, for example, a physical geographical subset of ZIP Code 22308. And sub-element 370 may comprise, for example, a 22nd physically sequential delivery point contained in geographical subset (sub-element 365) 0010. Taken together, sub-elements 360, 365, and 370 may comprise record 380. Furthermore, physical assignment of physical sequential delivery point codes may change as new residential dwellings are constructed and existing residential delivery points are destroyed. This changing process may be performed by reassigning the last two digit of the sequential delivery point record.

Furthermore, sorting processor 110 may receive delivery point address file 300 over network 120 and store delivery point address file 300 in memory 130 for latter use. A machine interface associated with sorting processor 110 may be connect to a visual display device (not shown) that may allow a delivery system operator to scroll through, for example, several of the ABC Company's delivery point address files. The delivery system operator may then select an appropriate ABC Company delivery point address file for an automated zone being currently processed by sorting equipment 105, as described below. The selection may be made using a standard keyboard, or touch screen, or similar device that would enable operator 115 to select a specific delivery point file, or files 300, to be used, for example, in process 440 as described below with respect to FIG. 4.

Alternatively, the delivery point address file, containing the delivery point address data associated with the plurality of unaddressed items, may be created by the delivery system operator. The USPS National Address Management System, for example, may contain delivery point information for every domestic address in the USA. A delivery system operator, such as the USPS, may automatically generate and distribute residential delivery point sub programs for every automated zone as a normal part of an automated process by which the delivery system operator sort programs are generated. This process may create a file that contains one sort program residential delivery point record for one, or a plurality of, automated delivery zone codes contained in the sort program. Using USPS ZIP Codes for example, the sort program for Alexandria Va. zone 22306 may contain delivery point information for Alexandria Virginia zones 22306 and 22308 that may be physically located in the same building and may distributed to delivery personnel together as part of the same secondary distribution scheme. In this way, the delivery system operator may create the delivery point address file.

Once sorting processor 110 receives the delivery point address data in stage 220, exemplary method 200 may advance to stage 230 where sorting equipment 105, under the control of sorting processor 110, may sort the plurality of unaddressed items based on the received delivery point address data. The plurality of unaddressed items may be sorted in an order in which they are to be delivered within a delivery zone specified by the delivery point address data. For example, sorting processor 110 may cause sorting equipment 105 to sort ones of the plurality of unaddressed items in a manner corresponding to each delivery point in the delivery zone identified by delivery point address file 300. As a result, an unaddressed item itself may be sorted in its proper sequence by sorting equipment 105 rather than manually placing a DAL in a case as in conventional systems.

Following the operator's file selection as described above, sorting software module 140 may cause the selected file to be loaded for causing sorting equipment 105 to sort the unaddressed items that belong to ABC Company. When the available ABC Company unaddressed items are sorted by sorting equipment 105, for example, the delivery system operator may deselect delivery point address file 300 and resume distribution with another program for the automated zone associated with sorting equipment 105. One advantage to the above may be that delivery point address files may be stored on machines as sort programs and senders may not be required to send address files along with their unaddressed items. After sorting equipment 105 sorts the plurality of unaddressed items, exemplary method 200 may end at stage 240.

Figure 4:
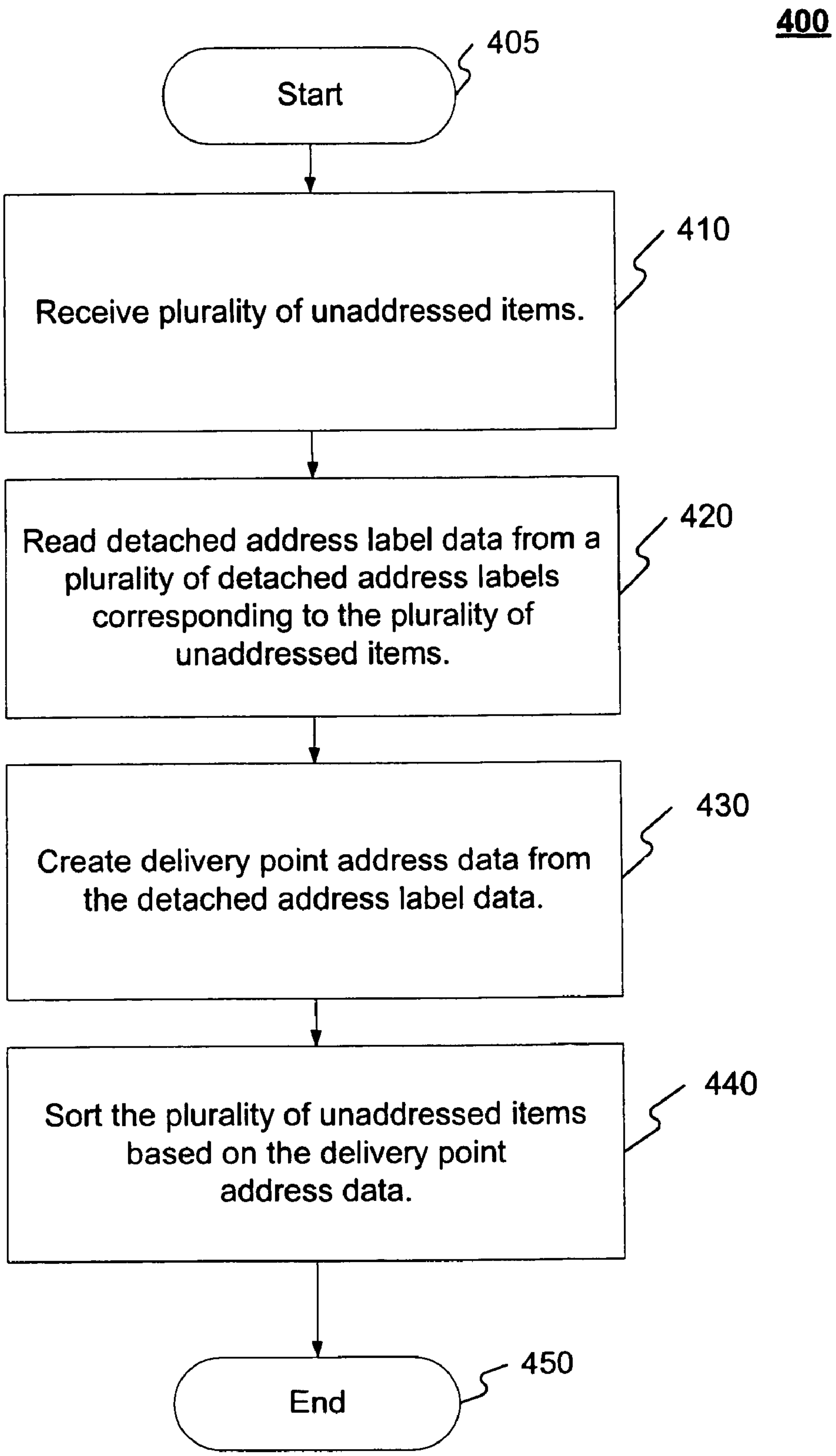
FIG. 4 is a flow chart of another exemplary method for sorting a plurality of unaddressed items consistent with an embodiment of the present invention.

FIG. 4 is a flow chart setting forth the general stages involved in another exemplary method for sorting a plurality of unaddressed items. Exemplary ways to implement the stages of method 400 will be described in greater detail below. Exemplary method 400 may begin at starting block 405 and proceed to stage 410 where a delivery system operator may receive a plurality of unaddressed items. For example, the delivery system operator may receive the plurality of unaddressed items in a similar manner as described above with respect to stage 210 in FIG. 2.

From stage 410, where the delivery system operator receives the plurality of unaddressed items, exemplary method 400 may advance to stage 420 where sorting equipment 105, under the control of sorting processor 110, may read DAL data from a plurality of DALs corresponding to the plurality of unaddressed, items. For example, sorting equipment 105 may be equipped with optical character readers (OCRs) that may allow it to read and convert items addressed in a digital format. System 100 may capture, decode, and store, for example, delivery point codes from DALs as item specific files that may not be retained by system 100 after the associated items are processed by sorting equipment 105. For example, an operator interface comprising a touch screen, or a standard keyboard may be used. When ABC Company's DALs are encountered, user 115 may switch sorting equipment 105 to DAL capture mode in order to read the DAL data.

Once sorting equipment 105 reads the DAL data in stage 420, exemplary method 400 may continue to stage 430 where sorting processor 110 may create delivery point address data from the detached address label data. For example, in DAL capture mode referenced above, sorting equipment 105 may read delivery point information for each DAL processes. The read delivery point information may be stored in a temporary or permanent delivery point address file in memory 130.

After sorting processor 110 creates the delivery point address data in stage 430, exemplary method 400 may proceed to stage 440 where sorting equipment 105, under the control of sorting processor 110, may sort the plurality of unaddressed items based on the created delivery point address data. For example, once the delivery point address file is created as-described in stage 430, user 115 may switch sorting equipment 105 to sort mode. In sort mode, user 115 may feed the plurality of unaddressed items into sorting equipment 105. At this point, sorting equipment 105 may sort those unaddressed items according to the delivery point address file in processor 110. In other words, using the created delivery point address file, sorting equipment 105 may sort the plurality of unaddressed items in a manner similar that that described above with respect to stage 230 in FIG. 2. After sorting equipment 105 sorts the plurality of unaddressed items in stage 440, exemplary method 400 may then end at stage 450.

While certain features and embodiments of the invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums, one skilled in the art will appreciate that these aspects can also be stored on or read from other types of computer-readable media, such as secondary storage devices, like hard disks, floppy disks, or a CD-ROM, a carrier wave from the Internet, or other forms of RAM or ROM. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A method for sorting a plurality of unaddressed items, the method comprising:

reading, by a reading device, detached address label data from a plurality of detached address labels corresponding to the plurality of unaddressed items;

creating, by a processing unit, delivery point address data from the read detached address label data; and sorting, by sorting equipment under control of the processing unit, the plurality of unaddressed items based on the delivery point address data, the plurality of unaddressed items being sorted in an order in which the plurality of unaddressed items are to be delivered within a delivery zone specified by the delivery point address data.

2. The method of claim 1, further comprising receiving the plurality of detached address labels.

3. The method of claim 2, wherein receiving the plurality of detached address labels further comprises receiving the plurality of detached address labels from a sender of the plurality of unaddressed items.

4. The method of claim 1, further comprising receiving the plurality of unaddressed items.

5. The method of claim 4, wherein receiving the plurality of unaddressed items further comprises receiving the plurality of unaddressed items from a sender of the plurality of unaddressed items.

6. The method of claim 1, wherein the delivery zone comprises a United States Postal Service ZIP code.

7. A system for sorting a plurality of unaddressed items, the system comprising:

a memory storage for maintaining a database;

a reading device that reads detached address label data from a plurality of detached address labels corresponding to the plurality of unaddressed items; and a processing unit coupled to the memory storage, wherein the processing unit creates delivery point address data from the read detached address label data; and sorting equipment that sorts the plurality of unaddressed items based on the delivery point address data, the plurality of unaddressed items being sorted in an order in which the plurality of unaddressed items are to be delivered within a delivery zone specified by the delivery point address data.

8. The system of claim 7, wherein the processing unit receives the detached address label data for the plurality of detached address labels.

9. The system of claim 8, wherein the processing unit receives the plurality of detached address labels from a sender of the plurality of unaddressed items.

10. The system of claim 7, wherein the processing unit receives the plurality of unaddressed items from a sender of the plurality of unaddressed items.

11. The system of claim 7, wherein the delivery zone comprises a United States Postal Service ZIP code.

12. A computer-readable storage medium comprising a set of instructions which when executed by a processor perform a method for sorting a plurality of unaddressed items, the method comprising:

reading, by a reading device, detached address label data from a plurality of detached address labels corresponding to the plurality of unaddressed items;

creating, by a processing unit, delivery point address data from the read detached address label data; and sorting, by sorting equipment under control of the processing unit, the plurality of unaddressed items based on the delivery point address data, the plurality of unaddressed items being sorted in an order in which the plurality of unaddressed items are to be delivered within a delivery zone specified by the delivery point address data.

13. The computer-readable storage medium of claim 12, the method further comprising receiving the plurality of detached address labels.

14. The computer-readable storage medium of claim 13, wherein receiving the plurality of detached address labels further comprises receiving the plurality of detached address labels from a sender of the plurality of unaddressed items.

15. The computer-readable storage medium of claim 12, the method further comprising receiving the plurality of unaddressed items.

16. The computer-readable storage medium of claim 15, wherein receiving the plurality of unaddressed items further comprises receiving the plurality of unaddressed items from a sender of the plurality of unaddressed items.

17. The computer-readable storage medium of claim 12, wherein the delivery zone comprises a United States Postal Service ZIP code.

* * * * *